(12) United States Patent
Clemen, Jr. et al.

(10) Patent No.: US 9,758,235 B2
(45) Date of Patent: Sep. 12, 2017

(54) THERMAL INSULATION SYSTEM, AIRCRAFT, AND VEHICLE HAVING SAME

(71) Applicant: The Boeing Company, Chicago, IL (US)

(72) Inventors: Mark Joseph Clemen, Jr., Chicago, IL (US); Jerry Lee Wert, Chicago, IL (US)

(73) Assignee: The Boeing Company, Chicago, IL (US)

( * ) Notice: Subject to any disclaimer, the term of this patent is extended or adjusted under 35 U.S.C. 154(b) by 184 days.

(21) Appl. No.: 14/881,337

(22) Filed: Oct. 13, 2015

(65) Prior Publication Data

US 2017/0101170 A1 Apr. 13, 2017

(51) Int. Cl.
| | | |
|---|---|---|
| *B64C 1/10* | (2006.01) | |
| *B64C 1/38* | (2006.01) | |
| *B64C 30/00* | (2006.01) | |
| *F41H 3/00* | (2006.01) | |
| *H01F 7/06* | (2006.01) | |
| *H01F 7/02* | (2006.01) | |

(52) U.S. Cl.
CPC ............. *B64C 1/38* (2013.01); *B64C 30/00* (2013.01); *F41H 3/00* (2013.01); *H01F 7/0273* (2013.01); *H01F 7/064* (2013.01)

(58) Field of Classification Search
CPC .. B64C 1/38; B64C 1/40; B64C 30/00; H01F 7/0273; H01F 7/0278; H01F 7/0284
See application file for complete search history.

(56) References Cited

U.S. PATENT DOCUMENTS

| | | | | |
|---|---|---|---|---|
| 2006/0196876 A1* | 9/2006 | Rohwer | ................... | F17C 3/04 220/560.12 |
| 2009/0145912 A1* | 6/2009 | Hyde | ................. | B65D 81/3802 220/592.26 |
| 2010/0213200 A1* | 8/2010 | Deane | ................ | B65D 81/3802 220/592.2 |
| 2014/0352329 A1* | 12/2014 | Bloedow | ................ | F25B 21/02 62/3.6 |

* cited by examiner

*Primary Examiner* — Richard G Davis
(74) *Attorney, Agent, or Firm* — Duft Bornsen & Fettig, LLP (57) ABSTRACT

A thermal insulation system for an aircraft that includes leading surfaces is provided. The thermal insulation system includes a carrier and a container. The carrier has an interior surface that includes a first plurality of magnets that generate a first magnetic field, and an exterior surface that is thermally coupled to the leading surfaces of the aircraft. The container is surrounded by the interior surface of the carrier, has an exterior surface including a second plurality of magnets that generate a second magnetic field oriented opposite the first magnetic field, and has an interior that includes electronics. The first magnetic field and the second magnetic field generate a gap between the carrier and the container to reduce a heat transfer from the leading surfaces to the electronics during operation of the aircraft.

20 Claims, 6 Drawing Sheets

(12) United States Patent
US 9,758,235 B2

THERMAL INSULATION SYSTEM, AIRCRAFT, AND VEHICLE HAVING SAME

FIELD

This disclosure relates to the field of aircraft, and in particular, to mitigating the thermal effects of flight on the electronics onboard an aircraft.

BACKGROUND

Hypersonic flight is often characterized as flight through the atmosphere at speeds above Mach 5. At these speeds, aerodynamic heating of the leading surfaces of the aircraft become problematic. Aerodynamic heating is the heating of a body produced by the flow of a fluid (e.g., air) over the body.

In hypersonic flight, the speed of the air molecules impinging on the aircraft rapidly falls to zero near the leading edges of the aircraft. Heating of the leading surfaces occurs as the kinetic energy of the air molecules is converted into thermal energy. The thermal energy heats the leading surfaces, which can transfer heat to other portions of the aircraft (e.g., electronics onboard the aircraft). At hypersonic speeds, the temperature of the leading surfaces can exceed 1000 degrees Celsius. Considerable effort has been made in the last few decades attempting to solve problems associated with aerodynamic heating of hypersonic vehicles.

SUMMARY

One aspect comprises a thermal insulation system for an aircraft that includes leading surfaces. The thermal insulation system comprises a carrier having an interior surface that includes a first plurality of magnets that generate a first magnetic field, and an exterior surface that thermally couples to the leading surfaces of the aircraft. The thermal insulation system further comprises a container surrounded by the interior surface of the carrier that has an exterior surface including a second plurality of magnets that generate a second magnetic field oriented opposite the first magnetic field, and an interior that includes electronics. The first magnetic field and the second magnetic field generate a gap between the interior surface of the carrier and the exterior surface of the container to reduce a heat transfer from the leading surfaces to the electronics during operation of the aircraft.

Another aspect comprises aircraft that includes an airframe, a carrier, and a container. The airframe includes leading surfaces. The carrier has an interior surface that includes a first plurality of magnets that generate a first magnetic field, and an exterior surface thermally coupled to the leading surfaces of the airframe. The container has an exterior surface that includes a second plurality of magnets that generate a second magnetic field oriented opposite the first magnetic field, and an interior that includes electronics for the aircraft. The first magnetic field and the second magnetic field generate a gap between the interior surface of the main body and the exterior surface of the container to reduce a heat transfer from the leading surfaces of the airframe to the electronics during operation of the aircraft.

Another aspect comprises a vehicle that includes a cylindrical section and a collar that circumscribes the cylindrical section. The cylindrical section includes a first plurality of magnets that generate a first magnetic field, and an inner surface that surrounds electronics for the vehicle. The collar has an inner surface that includes a second plurality of magnets that generate a second magnetic field oriented opposite the first magnetic field, and an outer surface that includes leading surfaces. The first magnetic field and the second magnetic field generate a gap between the outer surface of the cylindrical section and the inner surface of the collar to reduce a heat transfer from the leading surfaces to the electronics during operation of the vehicle.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some aspects are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Embodiments described herein provide thermal insulation for aircraft using magnetic fields to generate a gap between the high temperature components (e.g., the leading surfaces of the aircraft) and the temperature sensitive components (e.g., the electronics onboard the aircraft) during flight, such as during flight at hypersonic speeds. The gap can reduce a heat transfer from the high temperature components to the temperature sensitive components.

Figure 1:
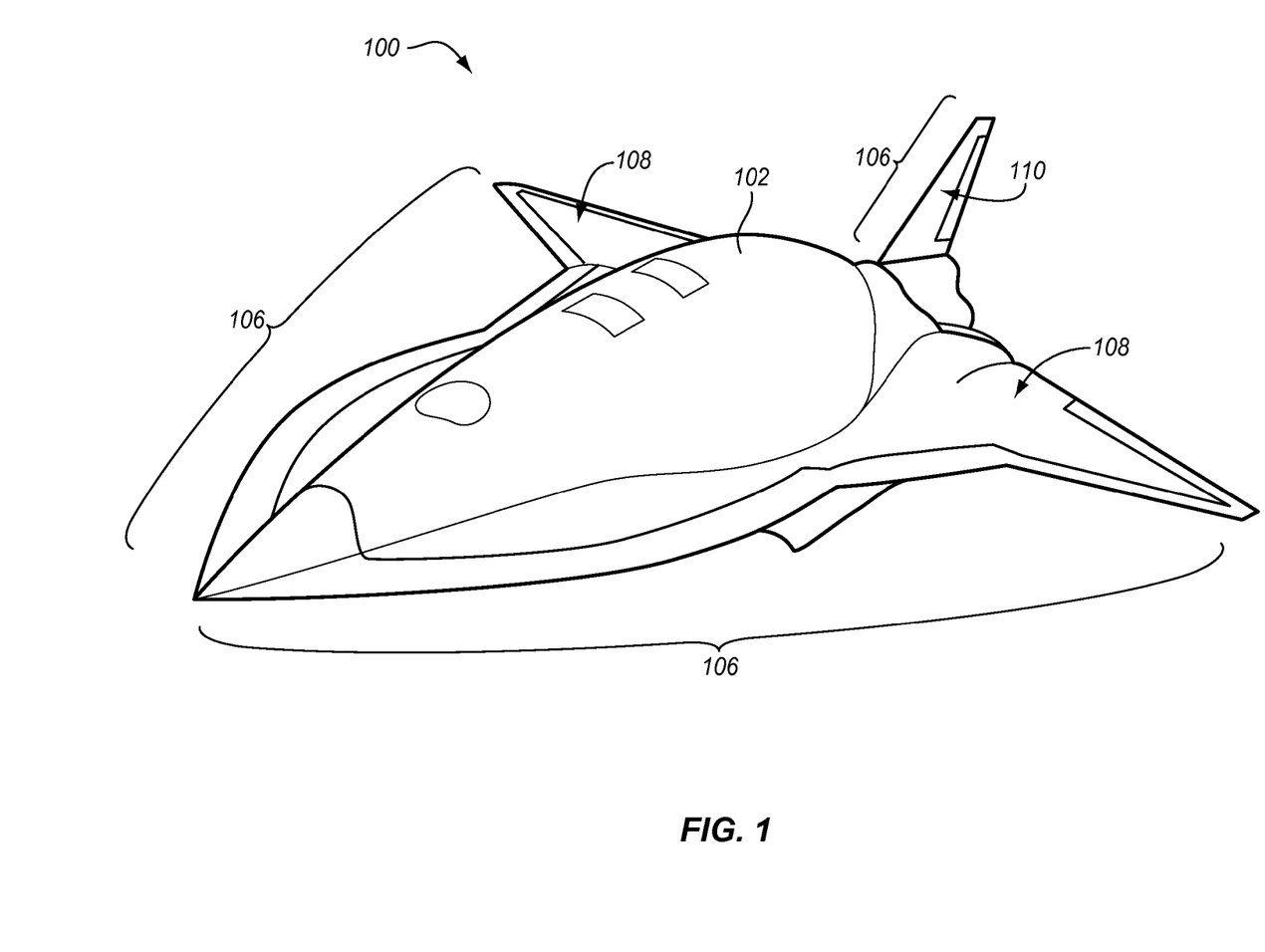
FIG. 1 illustrates an aircraft in an exemplary embodiment.

FIG. 1 illustrates an aircraft 100 in an exemplary embodiment. Aircraft 100 may be operated manned or unmanned as desired. Aircraft 100 is just one configuration of an aircraft capable of flight at hypersonic speed, and other configurations, not shown, may be implemented as desired. For example, aircraft 100 may have a different shape, size, aspect ratio, etc., as desired. Thus, aircraft 100 is merely shown in a particular configuration for purposes of discussion.

In this embodiment, aircraft 100 has an airframe 102 that includes one or more leading surfaces 106. For instance, some of leading surfaces 106 are located on a wing 108 of aircraft 100, and some of leading surfaces 106 are located on a tail 110 of aircraft 100. During operation of aircraft 100 in hypersonic flight (e.g., aircraft 100 moves at hypersonic speeds of Mach 5 and above), leading surfaces 106 are impinged by air molecules moving at high speed, which heats leading surfaces 106. The temperature of leading surfaces 106 can exceed 1000 degrees Celsius, which can heat components within aircraft 100 that may be sensitive to high temperatures. For instance, at such high temperatures, heat may be rapidly transferred from leading surfaces 106 into the interior of aircraft 100, adversely impacting electronic systems within aircraft 100 (e.g., flight electronics, control systems, etc.).

Figure 2:
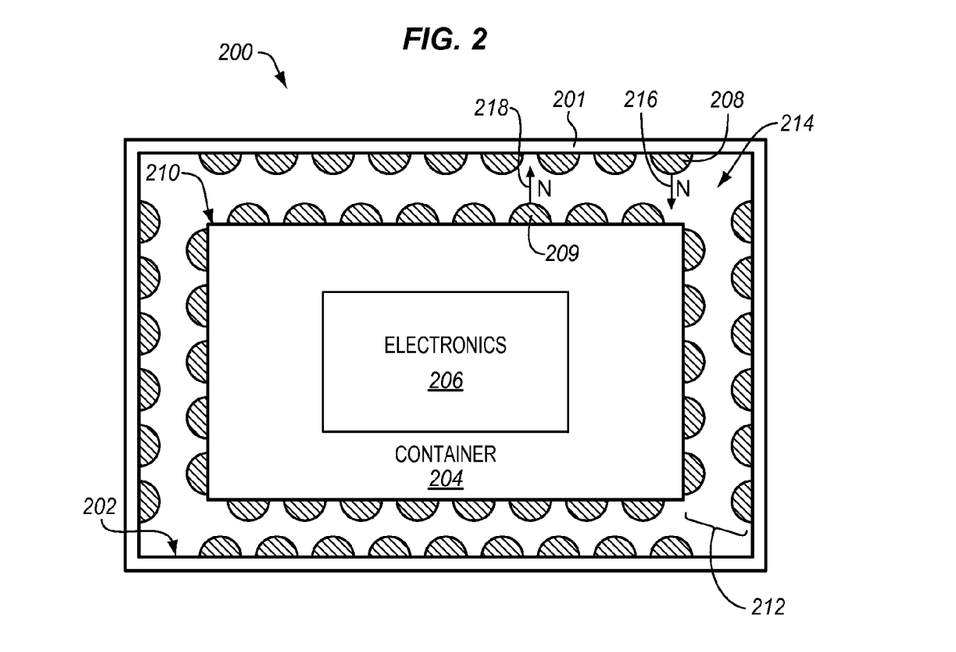
FIG. 2 illustrates a thermal insulation system in an exemplary embodiment.

FIG. 2 illustrates a thermal insulation system 200 for use with aircraft 100. System 200 may be used to provide thermal insulation between high temperature components (e.g., leading surfaces 106) and the electronics onboard aircraft 100. System 200 includes a carrier 201 that surrounds a container 204. Carrier 201 is thermally coupled to leading surfaces 106, and has an interior volume 214 defined by an interior surface 202 of carrier 201. Container 204 includes electronics 206 (e.g., flight electronics) for aircraft 100. Some examples of electronics for aircraft 100 include power supplies, processors, memory devices, accelerometers, Radio Frequency (RF) transmitters, RF receivers, inertial sensors, etc.

In the exemplary embodiment, magnets 208 are embedded within, and/or are located on a surface of, interior surface 202. Magnets 208 generate a magnetic field that is oriented in a direction indicated by an arrow 216 toward container 204.

Further, in the exemplary embodiment, magnets 209 are embedded within, and/or are located on a surface of, an exterior surface 210 of container 204. Magnets 209 generate a magnetic field that is oriented in a direction indicated by an arrow 218 toward interior surface 202 of carrier 201.

The magnetic fields of magnets 208-209 are configured to be in opposition to each other. For instance, the magnetic field orientation of magnets 208 are configured to be opposite the magnetic field orientation of magnets 209. Due to the opposing magnetic fields, container 204 is separated away from interior surface 202 of carrier 201, and may be centered within interior volume 214 of carrier 201. This separation forms a gap 212 between interior surface 202 of carrier and exterior surface 210 of container 204. Magnets 208-209 may include permanent magnets or electromagnets, or some combination of permanent magnets and electromagnets as desired. Some examples of materials that may be used to form magnets 208-209 include heusler alloys formed from Co, Fe, Cu, Zr, sintered alloys of Co, Fe, Cu, Zr, etc.

During flight, such as hypersonic flight, temperatures of leading surfaces 106 of aircraft 100 (see FIG. 1) increase and the heated leading surfaces 106 may transfer heat into carrier 102. Gap 212 formed due to magnetic repulsion between magnets 208-209 prevents container 204 from directly contacting carrier 102. Accordingly, gap 212 reduces the heat transfer between carrier 102 and container 204, which in turn, reduces the heat transfer between carrier 102 and electronics 206. In some embodiments, exterior surface 210 of container 204 may include an infrared (IR) reflective coating configured to reduce the heat transfer from carrier 102 to container 204 due to radiative heat transfer. In other embodiments, gap 212 may be under vacuum to reduce the heat transfer between carrier 102 and container 204 due to convective heat transfer. In some embodiments, a coolant may flow within gap 212 such that the coolant removes heat from container 204. The coolant may be a gas or a liquid as desired. For instance, the coolant may be a fuel for aircraft 100 that flows past container 204 through gap 212.

Figure 3:
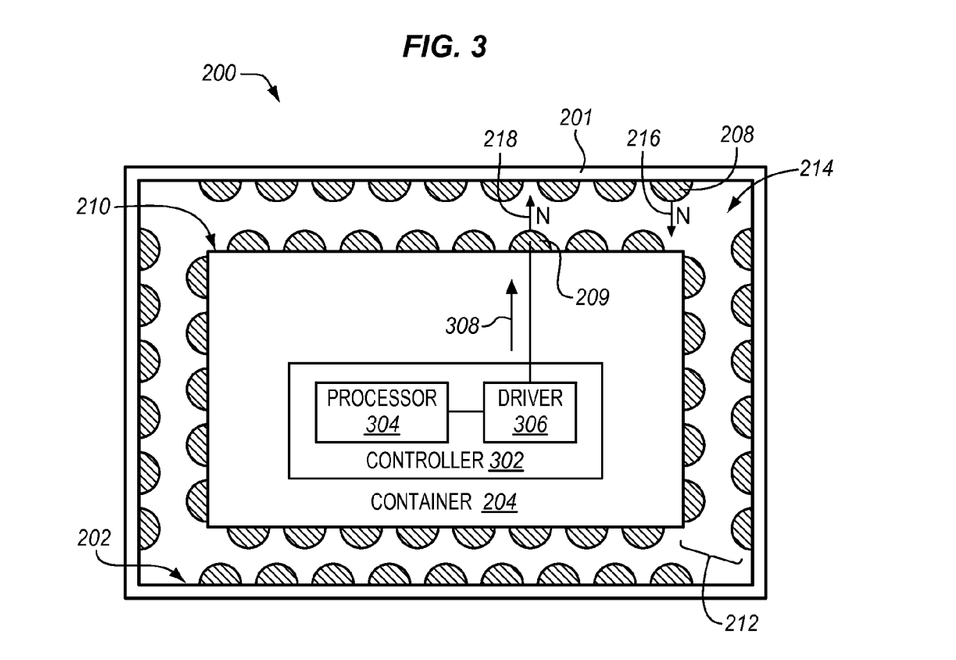
FIG. 3 illustrates another view of the thermal insulation system of FIG. 2 in an exemplary embodiment.

FIG. 3 illustrates another view of system 200. In this embodiment, magnets 209 along exterior surface 210 of container 204 are electromagnets. A controller 302 within container 204 is capable of generating an excitation current 308 that is used to generate and/or vary the magnetic field strength of magnets 209. During flight, controller 302 may provide excitation current 308 to magnets 209 to generate gap 212 between interior surface 202 of carrier 102 and exterior surface 210 of container 204.

In some embodiments, controller 302 may monitor gap 212 and adjust excitation current 308 to adjust gap 212. During flight of aircraft 100, turbulence may cause gap 212 to vary in magnitude as a motion is introduced between carrier 102 and container 204. Over time, these motions or variations of gap 212 may cause heating of container 204 due to the time varying magnetic fields induced upon container 204. Controller 302 is able to monitor the changes in gap 212, and to vary excitation current 308 to dampen or reduce the variations in gap 212, which in turn reduces the heating that may be imposed upon container 204 due to magnetic eddy currents.

While the specific hardware implementation of controller 302 is subject to design choices, one particular embodiment includes one or more processors 304 coupled with a current driver 306. Processor 304 includes any electronic circuits and/or optical circuits that are able to perform the functions described herein. For example, processor 304 may perform any functionality described herein for controller 302. Processor 304 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Current driver 306 includes any electronic circuits, and/or optical circuits, and/or power electronic circuits that are able to generate and/or vary excitation current 308. For instance, current driver 306 may include solid state power relays, switched-contact power relays, transistors, etc., used to generate and/or vary excitation current 308.

Figure 4:
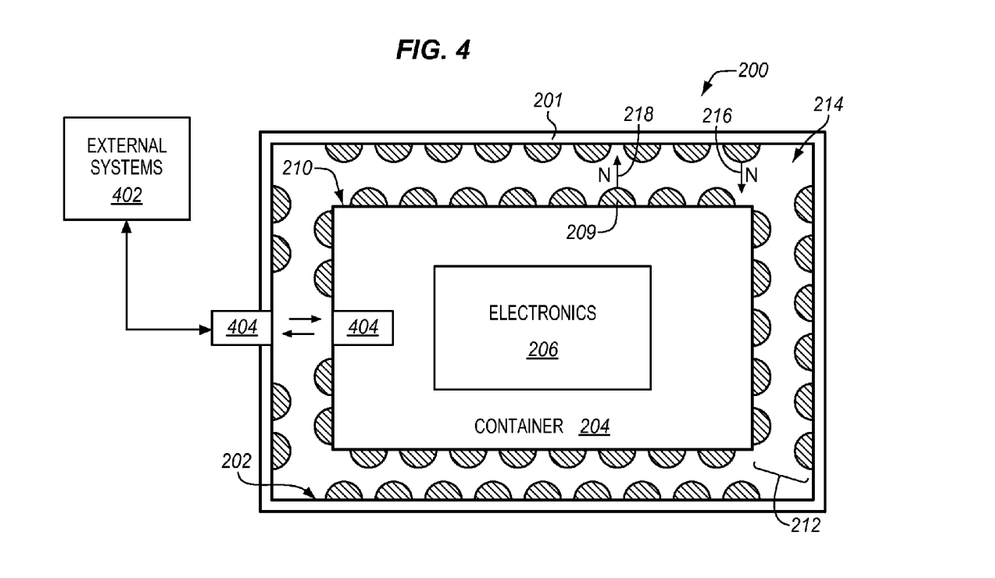
FIG. 4 illustrates another view of the thermal insulation system of FIG. 2 in an exemplary embodiment.

FIG. 4 illustrates another view of system 200. As shown in FIG. 4, electronics 206 are capable of communicating with external systems 402 (e.g., electronic systems outside of container 204) utilizing one or more transceivers 404. Transceivers 404 may include RF transmitter/receiver pairs, optical transmitter/receiver pairs, fiber optic bundles, etc., which allow for non-contact or thermally non-conductive communications between electronics 206 and external systems 402. Non-contact or thermally non-conductive communications are desired for reducing the heat transfer from carrier 102 to container 204 and ultimately, for reducing the heat transfer from carrier 102 to electronics 206.

Figure 5:
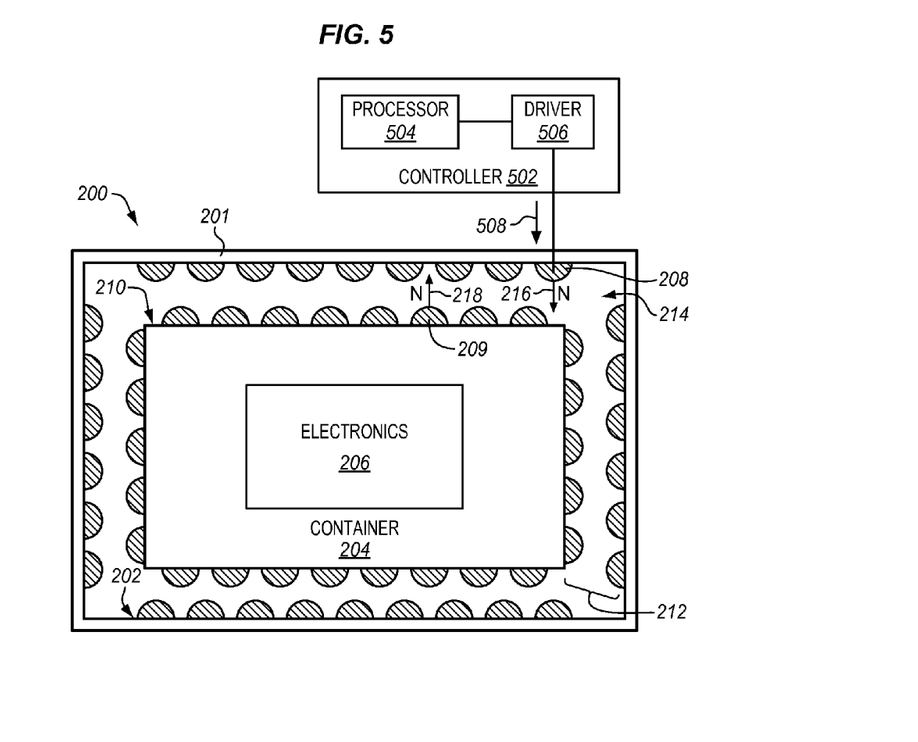
FIG. 5 illustrates another view of the thermal insulation system of FIG. 2 in an exemplary embodiment.

FIG. 5 illustrates another view of system 200. As shown in FIG. 5, magnets 208 along interior surface 202 of carrier 102 are electromagnets. A controller 502 is capable of generating an excitation current 508 that is used to generate and/or vary the magnetic field strength of magnets 208.

During flight, controller 502 may provide excitation current 508 to electromagnets 208 to generate gap 212 between interior surface 202 of carrier 102 and exterior surface 210 of container 204.

In some embodiments, controller 502 may monitor gap 212 and adjust excitation current 508 to adjust gap 212 in a manner previously described for controller 302. In embodiments where both controller 302 and controller 502 are included in system 200, coordination may occur between controller 302 and controller 502 to initiate gap 212 and/or vary gap 212 during flight. This coordination may be possible using transceivers 404 illustrated and previously discussed with respect to FIG. 4. In embodiments where only controller 302 is present, then magnets 208 may comprise permanent magnets, while magnets 209 comprise electromagnets. In embodiments where only controller 502 is present, then magnets 209 may comprise permanent magnets, while magnets 208 comprise electromagnets.

While the specific hardware implementation of controller 502 is subject to design choices, one particular embodiment includes one or more processors 504 coupled with a current driver 506. Processor 504 may include hardware embodiments previously described for processor 304, and current driver 506 may include hardware embodiments previously described for current driver 306.

Figure 6:
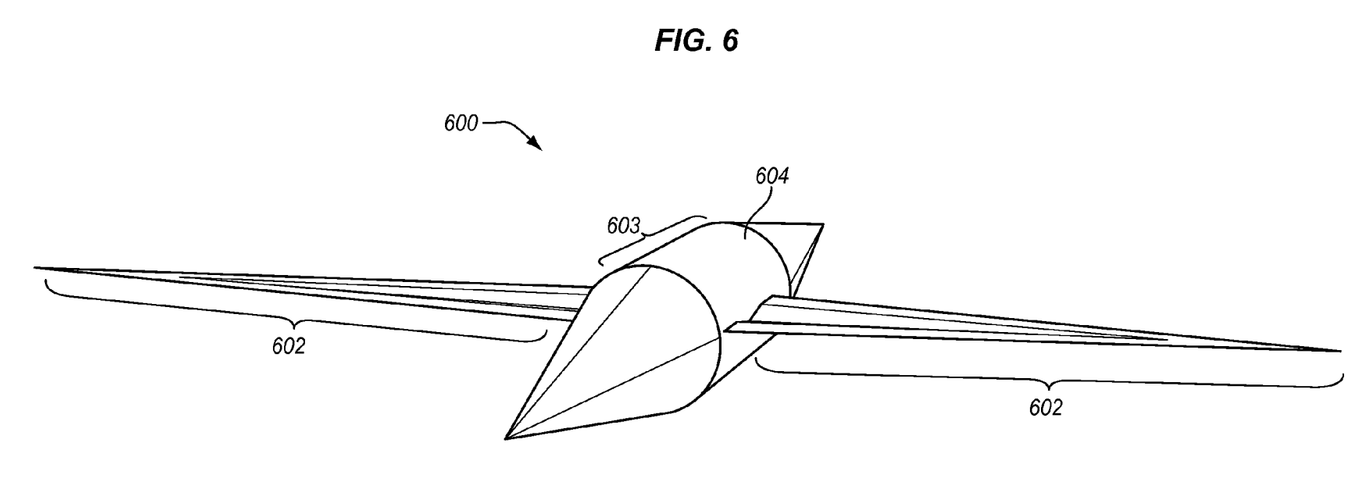
FIG. 6 illustrates another aircraft in an exemplary embodiment.

FIG. 6 illustrates another aircraft 600 in an exemplary embodiment. In some embodiments, aircraft 600 may be configured for hypersonic flight (e.g., aircraft 600 may be configured to fly at hypersonic speeds of Mach 5 and above). Aircraft 600 is just one configuration of an aircraft, and other configurations, not shown, may be implemented as desired. For example, aircraft 600 may have a different shape, size, aspect ratio, etc., as desired. Thus, aircraft 600 is merely shown in a particular configuration for purposes of discussion. In this embodiment, aircraft 600 includes leading surfaces 602, which are located along an outer surface 603 of a collar 604.

Figure 7:
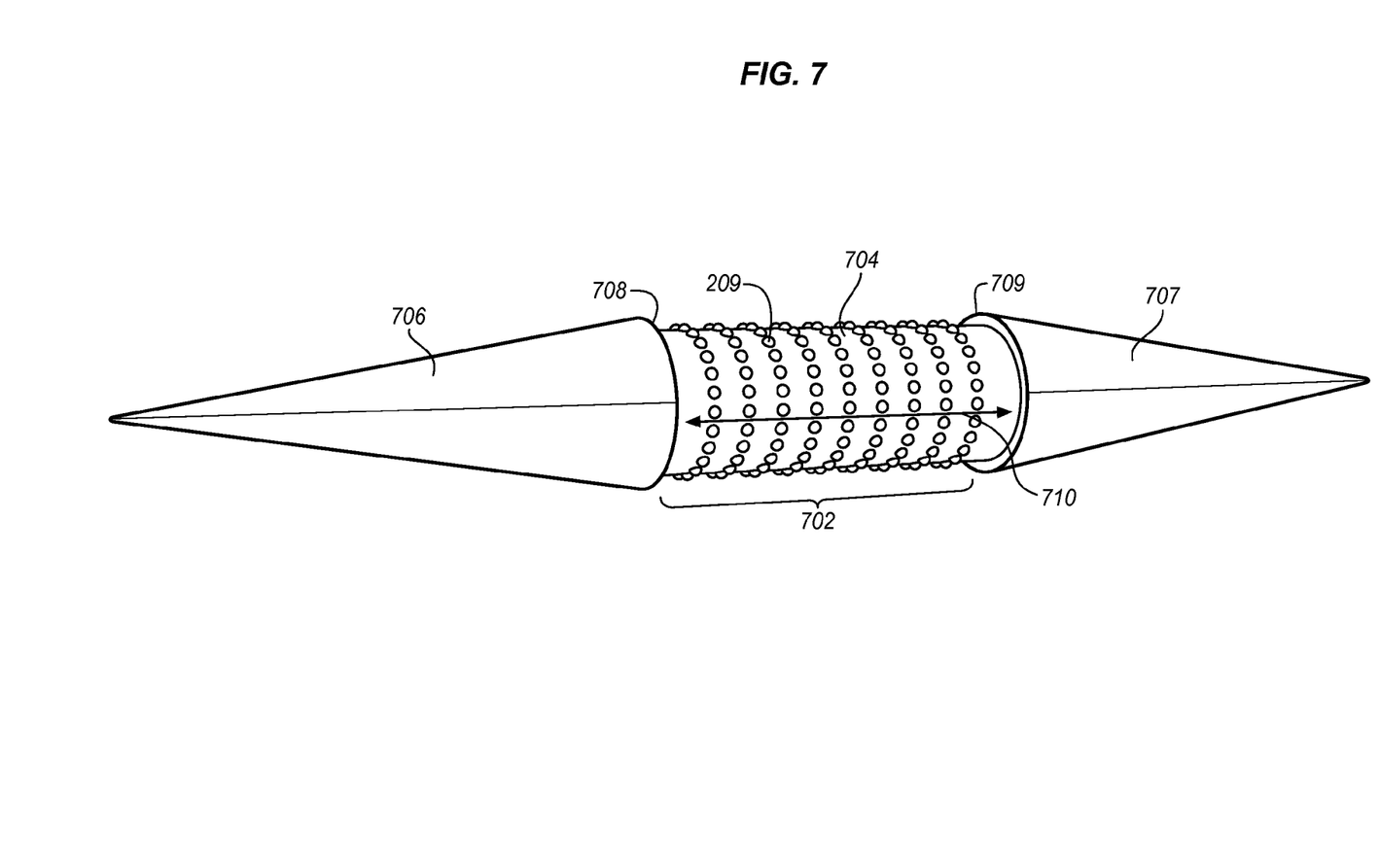
FIG. 7 illustrates a cylindrical section of the aircraft of FIG. 6 in an exemplary embodiment.

FIG. 7 illustrates a portion of aircraft 600 including a cylindrical section 702. In this view, magnets 209 are located on an outer surface 704 of cylindrical section 702. FIG. 7 also illustrates cones 706-707, which are coupled to cylindrical section 702. Cone 706 is coupled to end 708 of cylindrical section 702, and cone 707 is coupled to end 709 of cylindrical section 702. Where cones 706-707 and ends 708-709 meet, features are formed to prevent collar 704 from translating axially between ends 708-709 of cylindrical section 702 along a long axis 710 of cylindrical section 702. In this embodiment, collar 604 is free to rotate with respect to cylindrical section 702.

In this embodiment, collar 604 circumscribes cylindrical section 702 of aircraft 600. In some embodiments, outer surface 704 of cylindrical section 702 may include an IR reflective coating configured to reduce the heat transfer from collar 604 to cylindrical section 702 due to radiative heat transfer.

Figure 8:
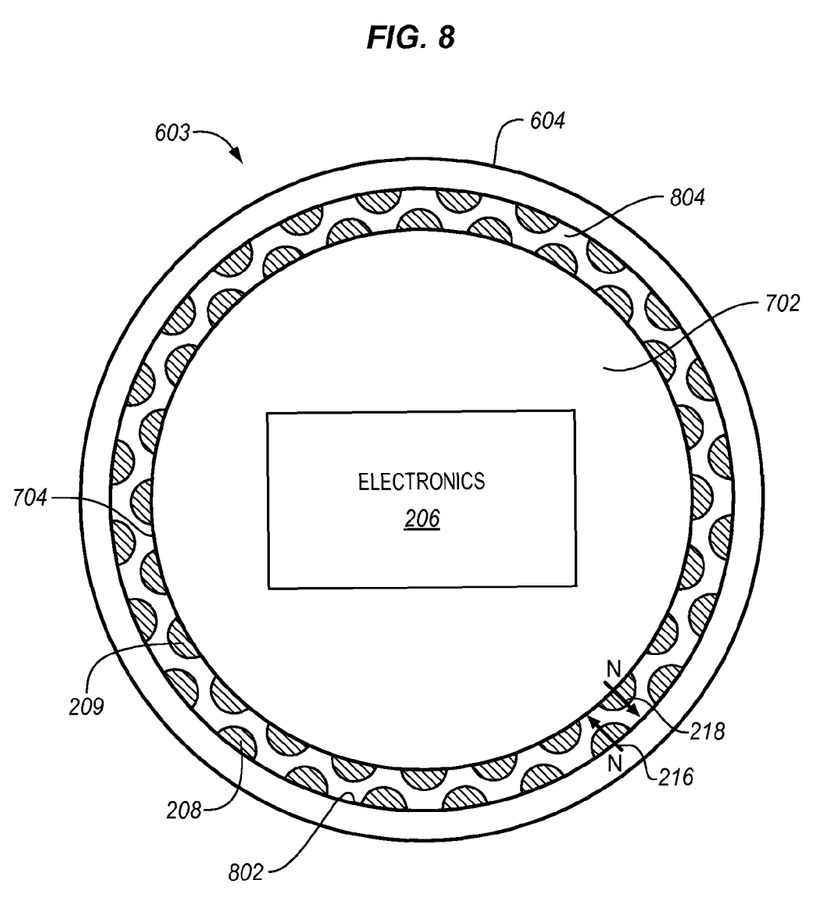
FIG. 8 illustrates a portion of a collar and a portion of the cylindrical section of FIG. 7 in an exemplary embodiment.

FIG. 8 illustrates a portion of collar 604 and a portion of a cylindrical section 702 of aircraft 600. In this view, collar 604 circumscribes cylindrical section 702. In particular, an inner surface 802 of collar 604 faces outer surface 704 of cylindrical section 702. Collar 604 includes a plurality and/or an array of magnets 208. Cylindrical section 702 also includes a plurality and/or an array of magnets 209. Magnets 208-209 have opposing magnetic fields that generate a gap 804 between collar 604 and cylindrical section 702.

During flight, temperatures of leading surfaces 602 of aircraft 600 (see FIG. 6) increase and leading surfaces 602 may transfer heat to collar 604. If collar 604 were in thermal contact with cylindrical section 702, then heat transfer would occur from leading surfaces 602 into cylindrical section 702 via collar 604. However, gap 804 formed due to the magnetic repulsion between magnets 208-209 prevents collar 604 from contacting cylindrical section 702 of aircraft 600. Accordingly, gap 804 reduces the heat transfer between collar 604 and cylindrical section 702, which in turn, reduces the heat transfer between collar 604 and electronics 206 that are contained within cylindrical section 702. In some embodiments, controller 302 and/or controller 502 may monitor gap 804 as previously described above for FIG. 3 and FIG. 5. For instance, with controller 302 modifying excitation current 308 applied to magnets 209, and/or with controller 502 modifying excitation current 508 applied to magnets 208. Therefore, any of the previously described functionality for controller 302 and/or controller 502 may apply for controlling gap 804 in aircraft 600.

Using the magnetic spacing generated between the high temperature components and the temperature sensitive components onboard an aircraft, aerodynamic heating can be reduced or eliminated, especially during hypersonic flight of the aircraft.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:
1. A thermal insulation system for an aircraft that includes leading surfaces, the thermal insulation system comprising:
   a carrier having an interior surface that includes a first plurality of magnets configured to generate a first magnetic field, and an exterior surface thermally coupled to the leading surfaces of the aircraft; and
   a container surrounded by the interior surface of the carrier, the container having an exterior surface including a second plurality of magnets configured to gener- ate a second magnetic field oriented opposite the first magnetic field, and an interior that includes electronics;

wherein the first magnetic field and the second magnetic field are configured to generate a gap between the interior surface of the carrier and the exterior surface of the container to reduce a heat transfer from the leading surfaces to the electronics during operation of the aircraft.

2. The thermal insulation system of claim 1 wherein:

the first plurality of magnets comprise electromagnets; and a controller that is configured to apply an excitation current to the first plurality of magnets to generate the first magnetic field.

3. The thermal insulation system of claim 2 wherein:

the controller is configured to monitor variations in the gap between the exterior surface of the container and the interior surface of the carrier, and to vary the excitation current applied to the first plurality of magnets to reduce the variations in the gap.

4. The thermal insulation system of claim 1 wherein:

the second plurality of magnets comprise electromagnets; and a controller that is configured to apply an excitation current to the second plurality of magnets to generate the second magnetic field.

5. The thermal insulation system of claim 4 wherein:

the controller is configured to monitor variations in the gap between the exterior surface of the container and the interior surface of the carrier, and to vary the excitation current applied to the second plurality of magnets to reduce the variations in the gap.

6. The thermal insulation system of claim 1 wherein:

the electronics comprises flight electronics for the aircraft.

7. The thermal insulation system of claim 6 wherein:

operation of the aircraft comprises hypersonic flight.

8. The thermal insulation system of claim 1 wherein:

the exterior surface of the container includes an Infrared reflective coating.

9. The thermal insulation system of claim 1 wherein:

the gap between the exterior surface of the container and the interior surface of the carrier is under vacuum.

10. The thermal insulation system of claim 1 wherein:

the gap between the exterior surface of the container and the interior surface of the carrier includes a coolant that transfers heat from the container to the coolant.

11. The thermal insulation system of claim 10 wherein:

the coolant is a fuel for the aircraft.

12. An aircraft comprising:

an airframe that includes leading surfaces;

a carrier having an interior surface that includes a first plurality of magnets configured to generate a first magnetic field, and an exterior surface thermally coupled to the leading surfaces of the airframe; and a container surrounded by the interior surface of the carrier, the container having an exterior surface including a second plurality of magnets configured to generate a second magnetic field oriented opposite the first magnetic field, and an interior that includes electronics;

wherein the first magnetic field and the second magnetic field are configured to generate a gap between the interior surface of the carrier and the exterior surface of the container to reduce a heat transfer from the leading surfaces of the airframe to the electronics during operation of the aircraft.

13. The aircraft of claim 12 wherein:

the leading surfaces are located on a wing of the airframe.

14. The aircraft of claim 12 wherein:

operation of the aircraft comprises hypersonic flight.

15. The aircraft of claim 12 wherein:

operation of the aircraft comprises manned flight.

16. A vehicle comprising:

a cylindrical section having an outer surface that includes a first plurality of magnets configured to generate a first magnetic field, and an inner surface that surrounds electronics for the vehicle; and a collar circumscribing the cylindrical section having an inner surface that includes a second plurality of magnets configured to generate a second magnetic field oriented opposite the first magnetic field, and an outer surface that includes leading surfaces;

wherein the first magnetic field and the second magnetic field are configured to generate a gap between the outer surface of the cylindrical section and the inner surface of the collar to reduce a heat transfer from the leading surfaces to the electronics during operation of the vehicle.

17. The vehicle of claim 16 wherein:

the vehicle is configured to move at hypersonic speeds.

18. The vehicle of claim 16 wherein:

the electronics for the vehicle comprises flight electronics.

19. The vehicle of claim 16 wherein:

the outer surface of the collar is coupled to a wing that includes at least one of the leading surfaces.

20. The vehicle of claim 16 wherein:

the outer surface of the cylindrical section includes an Infrared reflective coating.

* * * * *